United States Patent [19]

Kohtoku et al.

[11] Patent Number: 4,845,059
[45] Date of Patent: Jul. 4, 1989

[54] PROCESS FOR PRODUCING α-SIALON POWDER

[75] Inventors: Yasuhiko Kohtoku; Tetsuo Nakayasu, both of Ube, Japan

[73] Assignee: UBE Industries, Ltd., Japan

[21] Appl. No.: 26,685

[22] Filed: Mar. 17, 1987

[30] Foreign Application Priority Data

Mar. 20, 1986 [JP] Japan .................................. 61-60640

[51] Int. Cl.$^4$ .............................................. C04B 35/58
[52] U.S. Cl. ...................................... 501/98; 501/96; 423/115
[58] Field of Search ............................ 501/98, 96, 97; 423/115, 118

[56] References Cited

U.S. PATENT DOCUMENTS 4,506,020  3/1985  Butler et al. ......................... 501/97
4,547,470  10/1985  Tanase et al. ......................... 501/98

FOREIGN PATENT DOCUMENTS 60-086075  5/1985  Japan ..................................... 501/98
60-096577  5/1985  Japan ..................................... 501/98

*Primary Examiner*—William R. Dixon, Jr.
*Attorney, Agent, or Firm*—Finnegan, Henderson Farabow, Garrett & Dunner

[57] ABSTRACT

A fine particulate α-Sialon powder with a narrow particle size distribution, thus having an excellent sinterability, can be produced by using as the starting materials (a) amorphous silicon nitride, (b) metallic aluminum or aluminum nitride, and (c) an oxide of a metal which can be incorporated in the interstices of α-Sialon lattice or a metal compound capable of forming such a metal oxide upon thermal decomposition, and optionally, (d) an oxygen-containing compound of alumina or silicon, followed by heat treatment of the resultant mixture.

7 Claims, No Drawings

PROCESS FOR PRODUCING α-SIALON POWDER

BACKGROUND OF THE INVENTION

1. Field of the Invention

The present invention relates to a process for producing an α-Sialon powder, more specifically, to a process for producing a fine α-Sialon powder with a narrow particle size distribution, and thus having an excellent sinterability.

2. Description of the Related Art

α-Sialon is a solid solution type substance in which aluminum solute is on the silicon sites, oxygen solute is on the nitrogen sites, and one or more other metal solutes are in the interstices of the lattice, of α-silicon nitride. α-Sialon is represented by the general formula:

$$M_x(Si, Al)_{12}(O, N)_{16}$$

where M is a metal which is a solute incorporated in the interstices of the lattice and x has a value larger than 0 but not larger than 2.

α-Sialon has many characteristics required for engineering ceramics, such as high strength, high hardness, low expansion coefficient, excellent corrosion resistance and the like. Further, it has excellent electrical characteristics due to the metal solute incorporated in the interstices of the α-Sialon lattice, and accordingly, is promising for many electronic ceramic applications. Furthermore because it principally does not have a grain boundary phase, it has a light permeability.

It is known to produce a sintered α-Sialon by hot-pressing a mixture of, for example, crystalline silicon nitride, aluminum nitride, and an oxide of a metal which may be incorporated in the interstices of α-Sialon lattice, or by heating mixture as mentioned-above in a nitrogen gas atmosphere at normal pressure or with pressure. In these processes, the formation of α-Sialon phase and sintering proceed simultaneously, resultig in nonuniformity of the microstructure of the α-Sialon and elemental distribution therein, which tends to cause defects.

In order to solve the above problems, synthesis of an α-Sialon powder having an α-Sialon phase is under study for use as a raw material for sintered α-Sialon.

It is known to synthesize an α-Sialon powder by adding an organic solvent to a mixed powder of a silicon alkoxide, an aluminum alkoxide, and yttrium nitrate or a calcium alkoxide, dispersing a carbon powder therein, hydrolyzing the dispersion to form a precipitate, drying the precipitate, and calcinating the dried precipitate in a nitrogen gas atmosphere (Abstract of 24th Symposium on Basic Ceramics). This process can provide an α-Sialon powder having a fairly high purity but has drawbacks such as unreacted carbon remaining in the α-Sialon powder and the expense of the raw materials used. Hence, the process is industrially not satisfactory from the standpoints of raw materials and process per se.

SUMMARY OF THE INVENTION

The present invention provides an industrial process for producing fine particulate α-Sialon powder with a high purity.

More particularly, the present invention provides a process for producing an α-Sialon powder, which comprises mixing one of a combination of the following substances (a), (b) and (c) and a combination of the following substances (a), (b), (c) and (d) as the raw materials in such proportions that give a desired α-Sialon composition represented by the general formula:

$$M_x(Si, Al)_{12}(O, N)_{16}$$

where M is a metal which can be incorporated in the interstices of α-Sialon lattice, and x has a value greater than 0 but not greater than 2; and heating the resultant mixture at a temperature of 1,300° to 1,800° C. in a nitrogen-containing gas atmosphere, to crystallize the mixture.

(a) An amorphous silicon nitride powder;
(b) One of metallic aluminum and aluminum nitride;
(c) One of an oxide of a metal which can be incorporated in the interstices of α-Sialon lattice and a metal compound capable of forming such a metal oxide upon thermal decomposition;
(d) An oxygen-containing compound of one of aluminum and silicon.

DESCRIPTION OF THE PREFERRED EMBODIMENTS

The amorphous silicon nitride powder may be obtained by a known process, for example, by reacting silicon tetrahalide and ammonia in liquid or gas phase and then subjecting the reaction product to a heat treatment. This is a so-called amorphous powder and shows no clear diffraction when subjected to ordinary X-ray diffraction. A powder showing s slight diffraction in X-ray diffraction may be obtained depending upon conditions of the heat treatment of the above mentioned reaction product and such a powder is included in the amorphous silicon nitride powder used in the present invention.

Preferably, the metallic aluminum or the aluminum nitride is in a powder form. The metallic aluminum or the aluminum nitride can be used singly or in combination. The metallic aluminum is preferably used. It is presumed that, during crystallization, the metallic aluminum absorbs nitrogen from the nitrogen-containing gas atmosphere to form aluminum nitride and from that aluminum nitride and the amorphous silicon nitride an α-Sialon is formed.

Preferably, the metal which can be incorporated in the interstices of α-Sialon lattice is a metal having a valency not greater than 3, such as Li, Mg, Ca, Y or a lanthanide metal element other than La and Ce. The oxide of the above metal or the metal compound (e.g., a salt) capable of forming such metal oxide upon thermal decomposition includes the following compounds, for example.

$Li_2O$, $Li_2CO_3$, $Li_2(C_2O_4)$, $LiOH$, $MgO$, $MgCO_3$, $Mg(OH)_2$, $Mg_4(CO_3)_3(OH)_2.3H_2O$, $Mg(C_2O_4).2H_2O$, $CaO$, $CaCO_3$, $Ca(C_2O_4).H_2O$, $Ca(OH)_2$, $Y_2O_3$, $Y(OH)_3$, $Y_2(CO_3)_3.3H_2O$, $Y_2(C_2O_4)_3.9H_2O$, $Pr_2O_3$, $PrO_2$, $Pr_2(CO_3)_3.8H_2O$, $Pr_2(C_2O_4)_3.10H_2O$, $Nd_2O_3$, $Nd_2(CO_3)_3.8H_2O$, $Sm_2O_3$, $Eu_2O_3$, $Gd_2O_3$, $Gd_2(C_2O_4)_3.10H_2O$, $Tb_2O_3$, $Dy_2O_3$, $Ho_2O_3$, $Ho_2(C_2O_4)_3.10H_2O$.

These compounds can be used singly or in combination.

As the oxygen-containing compound of silicon, there can be mentioned, for example, silica, silica-containing materials, and silica precursors, e.g., silicon alkoxides. Of these, amorphous silica is preferably used.

As the oxygen-containing compound of aluminum, there can be mentioned, for example, alumina, alumina-containing materials, and alumina precursors, e.g., aluminum hydroxide and aluminum alkoxides. Of these, alumina is preferably used. Particularly, an alumina which has not been heat-treated at high temperatures of 1,000° C. or higher, as γ-alumina, is used most preferably.

The oxygen-containing compound of silicon and the oxygen-containing compound of aluminum may be used singly or in combination. In producing some α-Sialons having a particular composition, these compounds are not necessarily used.

Desirably, each raw material contains as little as possible of impurity metals. Preferably, the total content of impurity metals is not greater than 0.5% by weight of all raw materials. If the contents of impurity metals are high, they form a low melting point glass phase in the grain boundary phase, reducing the high temperature characteristics and light permeability of a sintered α-Sialon, obtained from the α-Sialon powder. Note, metals such as Be, Ga, Li, Mg, Ca, Y, and the like, which may be contained in the raw materials as impurities, are dissolved in the α-Sialon, and accordingly, do not significantly affect the above characteristics.

The mixing proportions of the amorphous silicon nitride powder (a), the substance (b), the substance (c), and optionally, the substance (d), should be such that the ratio of silicon, the aluminum, the oxygen, and the metal (M) which can be incorporated in the interstices of the α-Sialon lattice, all present in the above mixed powder, give a desired α-Sialon composition represented by the general formula $M_x(Si, Al)_{12}(O, N)_{16}$ ($0 < X \leq 2$), preferably $M_xSi_{12-(m+n)}Al_{(m+n)}O_nN_{16-n}$ ($0 < X \leq 2$, $1 \leq m \leq 4$, $0 < n \leq 2.5$, m=zx when the valency of M is z), except nitrogen [see Nature, Vol. 274, page 880, (1978)]. For example, the mixing proportions of the raw materials are as follows when the substance (b), (d), and (c) are AlN, Al$_2$O$_3$ and the following metal oxide, respectively. When a monovalent metal oxide e.g., Li$_2$O is used,

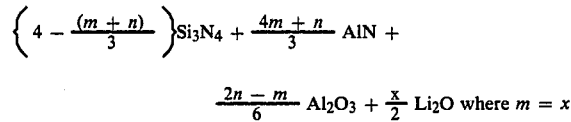

When a divalent metal oxide, e.g., MgO is used,

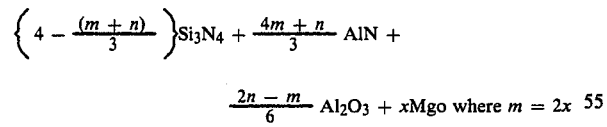

When a trivalent metal oxide e.g., Y$_2$O$_3$ is used,

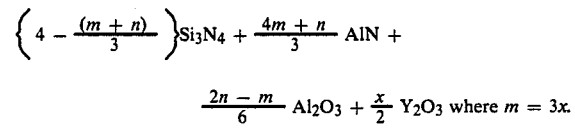

When metallic aluminum is used in place of the above AlN, the metallic aluminum should be used in an amount in which the amount of the aluminum corresponds to the amount of the aluminum of the AlN. When a metal salt is used in place of the above metal oxide, the metal salt should be used in an amount in which the amount of the metal corresponds to the amount of the metal of the metal oxide.

The method of mixing the raw materials is not particularly limited, and any known method can be used, for example, a method of dry-mixing the raw materials, or a method of wet-mixing the raw materials in an inert solvent substantially unreactive thereto, followed by removing the inert solvent therefrom. As the mixing apparatus, there can be preferably used a V-shaped mixer, a ball mill, a vibration ball mill, etc. Another method also may be used for preparing a mixed powder, wherein the substance (b), the substance (c), and optionally the substance (d), are mixed with and dispersed in a precursor of amorphous silicon nitride such as silicon diimide or silicon tetraimide, and the resultant dispersion is subjected to a heat treatment. In these mixing methods, the amorphous silicon nitride powder or its precursor must be handled in a controlled inert atmosphere because of their extreme sensitivity to water.

In the present invention, the mixed powder is then heated in a nitrogen gas-containing atmosphere to obtain a crystallized α-Sialon powder.

Exemplary suitable nitrogen gas-containing atmospheres include nitrogen gas atmosphere, ammonia gas atmosphere, and argon gas atmosphere containing nitrogen or ammonia.

The heating temperature is from 1,300° C. to 1,800° C. When the temperature is lower than 1,300° C., a long time is necessary for crystallization. When the temperature exceeds 1,800° C., thermal decomposition takes place causing a release of silicon monoxide, etc., whereby the composition of the powder formed deviates from that of a desired α-Sialon. The heating time is ordinarily not greater than 20 hours. The heating furnace used for heating the mixed powder is not particularly restricted. There can be used, for example, a batch type furnace, a rotary type furnace, a fluidizing type furnace and a pusher type furnace, in which high frequency induction heating or resistance heating may be adopted.

According to the present invention, an α-Sialon powder in which the particle size of the primary particle is fine and uniform in a range of 0.2 to 2 μm can be produced easily on an industrial scale. This α-Sialon powder has an excellent sinterability and the sintered body resultant therefrom has a uniform microstructure, compared with sintered α-Sialon produced according to a known process, and accordingly, can be used as a structural or electronics material with high reliability.

In order to further increase the toughness, strength, wear resistance, processability, densification rate, etc. of the Sialon-based ceramics produced by sintering the α-Sialon powder obtained according to the present invention, the α-Sialon powder obtained according to the present invention can be mixed with one or more of substances selected from oxides, nitrides, carbides and borides of the metals of the group IIIb, IVa, IVb, Va and VIa, silicon carbide whisker, silicon nitride whisker, β-sialon powder, metal halides, etc. in an appropriate amount, depending on the desired application of the ceramics, and the resultant mixture subjected to sintering.

EXAMPLES 1 TO 8

Predetermined amounts of an amorphous silicon nitride powder (specific surface area of about 350 m²/g) obtained by heat-treating silicon diimide at 1,200° C., metallic aluminum, a substance c) shown in Table 1 and γ-Al$_2$O$_3$ (specific surface area of about 100 m²/g) were mixed in a nitrogen gas atmosphere in a vibration mill for 1 hour. The resulting mixed powder was placed in a carbon crucible, which was then placed in a high frequency induction furnace and heated in a nitrogen gas atmosphere according to a temperature elevation schedule of 1 hour for elevation from room temperature to 1,200° C., 4 hours for elevation from 1,200° C. to 1,400° C., and 2 hours for elevation from 1,400° C. to 1,600° C., whereby the mixed powder was crystallized.

The composition and specific surface area of each powder obtained are shown in Table 1. The primary particles of the powders obtained in each Example had uniform particle diameters in a range of 0.8 to 1.2 μm. Each of the powders was ascertained by compositional analysis and X-ray diffraction to be an α-Sialon.

resultant mixture at a temperature of 1,300° C. to 1,800° C. in a nitrogen-containing gas atmosphere to crystallize the mixture.

2. A process according to claim 1, wherein said α-Sialon has a composition represented by the formula:

$$M_xSi_{12-(m+n)}Al_{(m+n)}O_nN_{16-n}$$

wherein M is a metal capable of incorporation in the interstices of α-Sialon lattice; x has a value greater than 0 but not greater than 2; m has a value of 1 to 4; n has a value greater than 0 but not greater than 2.5; and m=zx where the valency of M is z.

3. A process according to claim 1, wherein said metal oxide is selected from the group consisting of Li$_2$O, MgO, CaO, Y$_2$O$_3$, PrO$_2$, Nd$_2$O$_3$, Sm$_2$O$_3$, Eu$_2$O$_3$, Cd$_2$O$_3$, Tb$_2$O$_3$, Dy$_2$O$_3$ and Ho$_2$O$_3$.

4. A process according to claim 1, wherein said metal compound is selected from the group consisting of Li$_2$O$_3$, Li$_2$(C$_2$O$_4$), LiOH, MgCO$_3$, Mg(OH)$_2$, Mg$_4$(CO$_3$)$_3$(OH)$_2$.3H$_2$O, Mg(C$_2$O$_4$).2H$_2$O, CaCO$_3$, Ca(C$_2$O$_4$).H$_2$O, Ca(OH)$_2$, Y(OH)$_3$, Y$_2$(CO$_3$)$_3$.3H$_2$O,

TABLE 1

| Example | A—SN* [g] | Al [g] | Substance (c) Type | [g] | γ-Al$_2$O$_3$ [g] | alpha-SIALON composition Composition of product | Intended composition | Specific surface area [m²/g] |
|---|---|---|---|---|---|---|---|---|
| 1 | 180.6 | 14.9 | Li$_2$O | 5.5 | — | Li$_{0.9}$(Si$_{10.7}$Al$_{1.3}$)(O$_{0.6}$N$_{15.4}$) | Li$_{1.0}$(Si$_{10.5}$Al$_{1.5}$)(O$_{0.5}$N$_{15.5}$) | 1.9 |
| 2 | 188.6 | 5.7 | Li$_2$O | 2.1 | — | Li$_{0.4}$(Si$_{11.3}$Al$_{0.7}$)(O$_{0.4}$N$_{15.6}$) | Li$_{0.4}$(Si$_{11.4}$Al$_{0.6}$)(O$_{0.2}$N$_{15.8}$) | 4.4 |
| 3 | 47.3 | 5.2 | Li$_2$O | 1.5 | 0.5 | Li$_{1.1}$(Si$_{10.0}$Al$_{2.0}$)(O$_{1.1}$N$_{15.0}$) | Li$_{1.0}$(Si$_{10.0}$Al$_{2.0}$)(O$_{1.0}$N$_{15.0}$) | 1.9 |
| 4 | 94.2 | 6.0 | MgO | 3.0 | — | Mg$_{0.3}$(Si$_{10.9}$Al$_{1.1}$)(O$_{0.4}$N$_{15.6}$) | Mg$_{0.4}$(Si$_{10.8}$Al$_{1.2}$)(O$_{0.4}$N$_{15.6}$) | 2.6 |
| 5 | 46.0 | 3.8 | MgO | 1.9 | — | Mg$_{0.6}$(Si$_{10.5}$Al$_{1.5}$)(O$_{0.5}$N$_{15.5}$) | Mg$_{0.5}$(Si$_{10.5}$Al$_{1.5}$)(O$_{0.5}$N$_{15.5}$) | 0.8 |
| 6 | 56.1 | 5.6 | MgO | 2.4 | — | Mg$_{0.4}$(Si$_{9.8}$Al$_{2.2}$)(O$_{0.9}$N$_{15.1}$) | Mg$_{0.5}$(Si$_{10.0}$Al$_{2.0}$)(O$_{1.0}$N$_{15.0}$) | 1.5 |
| 7 | 39.8 | 4.1 | Y$_2$O$_3$ | 3.8 | — | Y$_{0.4}$(Si$_{10.0}$Al$_{2.0}$)(O$_{0.8}$N$_{15.2}$) | Y$_{0.4}$(Si$_{10.2}$Al$_{1.8}$)(O$_{0.6}$N$_{15.4}$) | 3.0 |
| 8 | 52.8 | 8.8 | Y$_2$O$_3$ | 8.2 | — | Y$_{0.7}$(Si$_{9.4}$Al$_{2.6}$)(O$_{1.0}$N$_{15.0}$) | Y$_{0.6}$(Si$_{9.3}$Al$_{2.7}$)(O$_{0.9}$N$_{15.1}$) | 2.4 |

*A—SN: Amorphous silicon nitride

We claim:

1. A process for producing an α-Sialon powder, which consists essentially of mixing as the raw materials substances (a), (b) and (c) or substances (a), (b), (c) and (d) wherein (a) is an amorphous silicon nitride powder, (b) is metallic aluminum or aluminum nitride, (c) is an oxide of at least one metal capable of incorporation in the interstices of an α-Sialon lattice selected from the group consisting of Li, Mg, Ca, Y and lanthanide metallic elements other than La and Ce or a metal compound capable of forming said metal oxide upon thermal decomposition, and (d) is an oxygen-containing compound of aluminum or silicon in proportions to obtain the desired α-Sialon composition represented by the formula (I)

$$M_x(Si, Al)_{12}(O, N)_{16} \qquad (I)$$

wherein M is a metal capable of incorporation in the interstices of an α-Sialon lattice, and x has a value greater than 0 but not greater than 2; and heating the Y$_2$(C$_2$O$_4$)$_3$.9H$_2$O, Pr$_2$(CO$_3$)$_3$.8H$_2$O, Pr$_2$(C$_2$O$_4$)$_3$.10H$_2$O, Nd$_2$(CO$_3$)$_3$.8H$_2$O, Gd$_2$(C$_2$O$_4$)$_3$.10H$_2$O and Ho$_2$(C$_2$O$_4$)$_3$.10H$_2$O.

5. A method according to claim 1, wherein said oxygen-containing compound of silicon is selected from the group consisting of silica, and silica precursors.

6. A method according to claim 1, wherein said oxygen-containing compound of alumina is selected from the group consisting of alumina, and alumina precursors.

7. A process according to claim 1, wherein said substances (b), (c), and optionally, (d) are mixed with and dispersed with substance (a) in the form of a precursor of said substance (a) wherein the precursor is at least one member selected from the group consisting of silicon diimide and silicon tetraimide; followed by heat treatment of the resultant mixture to obtain a mixture of said substances.

* * * * *

REEXAMINATION CERTIFICATE (1440th)

United States Patent [19]
Kohtoku et al.

[11] B1 4,845,059

[45] Certificate Issued  Mar. 26, 1991

[54] PROCESS FOR PRODUCING α-SIALON POWDER

[75] Inventors: Yasuhiko Kohtoku; Tetsuo Nakayasu, both of Ube, Japan

[73] Assignee: Ube Industries, Ltd. Japan

Reexamination Request:
No. 90/001,959, Mar. 15, 1990

Reexamination Certificate for:
Patent No.: 4,845,059
Issued: Jul. 4, 1989
Appl. No.: 26,685
Filed: Mar. 17, 1987

[30] Foreign Application Priority Data

Mar. 20, 1986 [JP]  Japan ................................. 61-60640

[51] Int. Cl.$^5$ ................................................ C04B 35/58
[52] U.S. Cl. ....................................... 501/98; 501/96; 423/115

[58] Field of Search .......................... 501/96, 97, 98; 423/115, 118

[56] References Cited

FOREIGN PATENT DOCUMENTS 63272  10/1982  European Pat. Off. .
57-3769  1/1982  Japan .
57-156378  9/1982  Japan .

*Primary Examiner*—William R. Dixon, Jr.

[57] ABSTRACT

A fine particulate α-Sialon powder with a narrow particle size distribution, thus having an excellent sinterability, can be produced by using as the starting materials (a) amorphous silicon nitride, (b) metallic aluminum or aluminum nitride, and (c) an oxide of a metal which can be incorporated in the interstices of α-Sialon lattice or a metal compound capable of forming such a metal oxide upon thermal decomposition, and optionally, (d) an oxygen-containing compound of alumina or silicon, followed by heat treatment of the resultant mixture.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *